United States Patent
Loniello

[11] Patent Number: 6,158,162
[45] Date of Patent: Dec. 12, 2000

[54] FISHING LURE

[75] Inventor: Vincent S. Loniello, Lodi, Wis.

[73] Assignee: King Cole Baits, LLC, Lodi, Wis.

[21] Appl. No.: 09/300,080

[22] Filed: Apr. 26, 1999

Related U.S. Application Data

[60] Provisional application No. 60/083,160, Apr. 27, 1998.

[51] Int. Cl.[7] .................................................. A01K 85/00
[52] U.S. Cl. ........................ 43/42.13; 43/42.11; 43/42.14
[58] Field of Search ............................... 43/42.11, 42.13, 43/42.14, 42.15, 42.16, 42.18, 42.19, 42.5

[56] References Cited

U.S. PATENT DOCUMENTS

| | | | |
|---|---|---|---|
| Re. 35,160 | 2/1996 | Nichols | 43/42.53 |
| D. 222,998 | 2/1972 | Harris | 43/42.14 |
| 1,585,943 | 5/1926 | Streich | 43/42.5 |
| 1,832,768 | 11/1931 | Davenport | 43/42.13 |
| 1,913,362 | 6/1933 | Catarau | 43/42.5 |
| 2,051,978 | 8/1936 | Accetta | 43/42.18 |
| 2,266,234 | 12/1941 | Mitchell | 43/42.13 |
| 3,405,475 | 10/1968 | Ross | 43/42.18 |
| 3,750,325 | 8/1973 | Feltman | 43/42.14 |
| 3,805,437 | 4/1974 | Harris | 43/42.13 |
| 3,942,281 | 3/1976 | Hill | 43/42.15 |
| 3,953,934 | 5/1976 | Visser | 43/42.06 |
| 3,996,688 | 12/1976 | Hardwicke, III | 43/42.11 |
| 4,133,135 | 1/1979 | Miles | 43/42.13 |
| 4,138,791 | 2/1979 | Anson | 43/42.15 |
| 4,536,986 | 8/1985 | Stout | 43/42.11 |
| 4,745,699 | 5/1988 | Gage | 43/42.09 |
| 4,884,358 | 12/1989 | Grove et al. | 43/42.13 |
| 4,888,908 | 12/1989 | Morris | 43/42.16 |
| 4,891,900 | 1/1990 | Snyder | 43/42.5 |
| 4,891,901 | 1/1990 | Baker, Jr. | 43/42.11 |
| 4,916,854 | 4/1990 | Martin | 43/42.19 |
| 5,092,073 | 3/1992 | Kaecker | 43/42.39 |
| 5,228,230 | 7/1993 | Vaught | 43/42.26 |
| 5,253,446 | 10/1993 | Ogle | 43/42.13 |
| 5,321,905 | 6/1994 | Higgins | 43/42.14 |
| 5,505,015 | 4/1996 | Delricco | 43/42.13 |
| 5,647,163 | 7/1997 | Gorney | 43/42.13 |
| 5,664,365 | 9/1997 | Walden | 43/42.13 |
| 5,887,379 | 3/1999 | Lockhart | 43/42.13 |

FOREIGN PATENT DOCUMENTS

| | | | |
|---|---|---|---|
| 672090 | 12/1929 | France | 43/42.15 |
| 1424070 | 11/1965 | France | 43/42.15 |
| 90663 | 12/1967 | France | 43/42.15 |
| 92564 | 10/1968 | France | 43/42.15 |

OTHER PUBLICATIONS

Bass Pro Shops Catalog, Springfield, MO, 4 pages.
Big Fish Tackle Company Catalog, 2 pages.
Cabela's Catalog, Spring 1995, 6 pages.
Choice Collections Catalog (1994), North Little Rock, AR, 1 page.
NetCraft Tackle Catalog, Toledo, OH, 3 pages.

*Primary Examiner*—Darren W. Ark
*Attorney, Agent, or Firm*—Craig A. Fieschko, Esq.; DeWitt Ross & Stevens S.C.

[57] ABSTRACT

A fishing lure of the spinnerbait type is described wherein a body plug weight has an elongated stem extending from a body forward end to terminate in a rigidly affixed forward loop to which a fishing line may be attached, and also has a rigidly affixed body tail loop to which a hook may be attached. An arm extends from the stem to which one or more blades may be attached and blades may also be interposed between the body tail loop and the hook.

20 Claims, 1 Drawing Sheet

FISHING LURE

CROSS-REFERENCE TO RELATED APPLICATIONS

This application claims priority under 35 USC §119(e) to U.S. Provisional Patent application No. 60/083,160 filed Apr. 27, 1998, the entirety of which is incorporated by reference herein.

FIELD OF THE INVENTION

This disclosure concerns an invention relating generally to fishing lures, and more specifically to an improved spinnerbait fishing lure.

BACKGROUND OF THE INVENTION

One type of known fishing lure is known as a "spinnerbait," wherein a V-shaped length of wire includes one or more blades (i.e., shiny flat metal plates, generally shaped in an oval form) or spoons (i.e., blades having a concave form) on one arm of the V, and the other arm bears a plug weight having a single trailing hook embedded therein. A skirt of tendrils is then often provided on the plug weight. The spinnerbait lure is attached to fishing line by tying the line near the vertex of the V. When the spinnerbait is cast out and retrieved, the spinners (the blades/spoons) move about in the water to reflect light in a variety of directions, and they also create vibrations in the water which are detected by fish. The tendrils of the skirt also move to catch the attention of fish. Spinnerbait lures are commonly used for catching aggressive game fish, particularly bass.

DETAILED DESCRIPTION OF PREFERRED FORMS OF THE INVENTION

Figure 1:
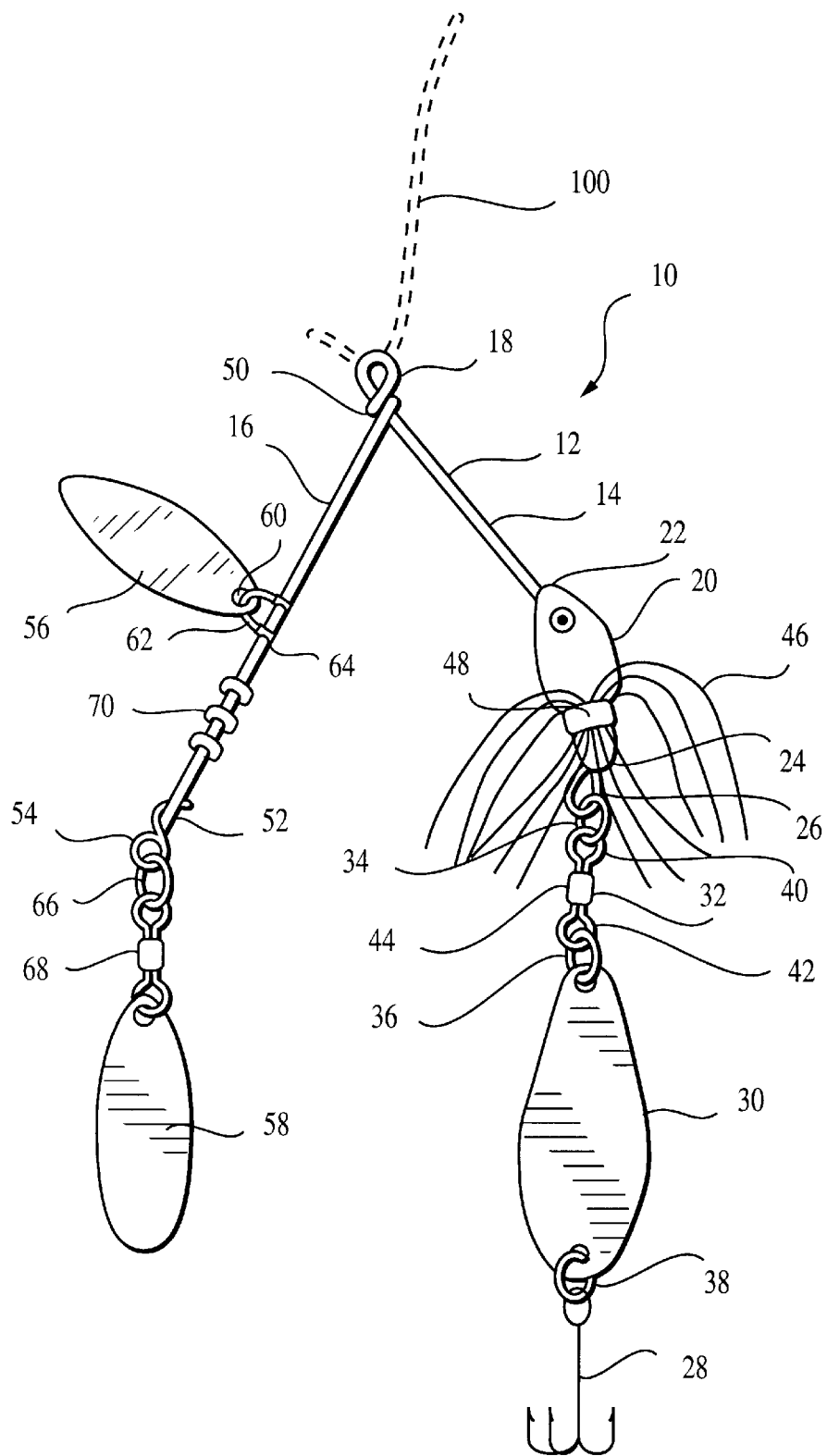

The invention, which is defined by the claims set out at the end of this disclosure, is directed to a fishing lure of the spinnerbait type which is believed to offer markedly superior performance over prior spinnerbait lures known to the inventor. The fishing lure will now be described in greater detail with reference to the accompanying FIGURE, wherein a perspective view of a preferred version of the lure is presented.

Referring to the FIGURE, the fishing lure 10 is shown connecting to a fishing line 100 (shown in phantom). The lure 10 includes a V-wire 12 having two sections, one of which will be referred to as the stem 14 and the other which will be referred to as the arm 16. The fishing line 100 is preferably tied to the V-wire 12 at the vertex of the stem 14 and arm 16, which may be formed into a forward loop 18 if desired, as by wrapping the wire of the arm 16 about the stem 14.

A body plug 20 is attached to the stem 14 opposite the forward loop 18. The term "body plug" is intended to mean a mass of weighting material formed in a nonplanar/nonconvex shape, e.g., spherical shapes, ovular shapes, cigar shapes, etc. In the lure 10, a cigar-shaped or minnow-shaped lead body plug 20 is shown. The stem 14 is preferably rigidly affixed to the body plug 20 by molding the body plug 20 about the stem 14 so that the stem 14 extends from the body plug 20 at a body forward end 22. It is noted that the term "rigidly affixed" refers to affixment under standard conditions of casting and retrieving, rather than under heavy loading, since the wire of stem 14 (and of the V-wire 12 in general) will naturally flex if subjected to high loads.

Opposite the body forward end 22 from which the stem 14 extends, a body tail end 24 is defined from which a tail loop 26 extends. As with the stem 14, the tail loop 26 is preferably rigidly affixed to the body plug 20 by forming it of wire having a portion about which the body plug 20 is cast. The tail loop 26 may in fact be formed from the same length of wire forming the stem 14, wherein the stem extends into the body forward end 22 of the body plug 20, through its interior, and out of the body tail end 24. The tail loop 26 is believed to be a particularly beneficial feature of the lure 10 illustrated in the FIGURE, since it allows components (discussed below) to be pivotally linked to the body plug 20 so that they may move when trailing the body plug 20 through the water. This is in contrast to prior spinnerbait lures known to the inventor, wherein a hook is rigidly affixed to the body tail end 24. In the lure 10, a hook 28 is pivotally attached to the tail loop 26 preferably via an intermediate chain of components: a tail blade 30; a swivel 32; and rings 34, 36, and 38, which are respectively situated between the tail loop 26 and the swivel 32, the swivel 32 and the tail blade 30, and the tail blade 30 and the hook 28. Since these components may move with respect to the body plug 20, they are believed to have a greater effect in attracting fish and inducing them to strike at the hook 28.

Unlike known prior spinnerbait lures, the hook 28 of the lure 10 is preferably a multiple hook, e.g., a treble hook as shown in the FIGURE, or a double or quad hook.

The tail blade 30 preferably has the elongated ovular shape shown in the FIGURE, though other shapes could be used as well.

The swivel 32 is a known component having a forward swivel loop 40 pivotally linked to the split ring 34 on the tail loop 26, and a tail swivel loop 42 pivotally linked with the split ring 36 engaging the tail blade 30. The forward and tail swivel loops 40 and 42 are pivotally connected to a barrel 44 so that the planes of the swivel loops rotate about a common axis.

The rings 34, 36, and 38 are preferably split rings rather than solid rings, i.e., they are formed of lengths of wire which are bent in helical form so that the tail loop 26, swivel 32, tail blade 30, hook 28, etc. may be inserted into and run circumferentially about the split rings until they rest within the interiors of the split rings.

Owing to the swivel 32 and the numerous links between the tail loop 26 and the tail blade 30, the hook 28 and tail blade 30 are effectively allowed to move in six degrees of freedom with respect to the body plug 20.

A skirt 46 then protrudes from the body plug 20, and is preferably formed of multiple lengths of rubber or textile strips or strings banded or otherwise connected to the body plug 20 (with a band 48 being shown in the FIGURE).

On the opposite side of the V-wire from the stem 14, the arm 16 extends from the forward loop 18 at a first arm end 50 to terminate in a second arm end 52, whereupon a trailing arm loop 54 is formed (as by bending over the second arm end 52 and wrapping it about an adjacent portion of the arm 16, as shown in the FIGURE). It is then desirable to provide the arm 16 with one or more blades, with the preferred lure 10 including a sliding blade 56 slidably mounted on the arm 16, and a trailing blade 58 affixed to the second arm end 52.

It is noted that the stem 14 preferably has a different length than the arm 16—with the stem 14 being shown shorter than the arm 16 in the FIGURE—so that when the lure 10 is pulled through the water behind a fishing line 100, rotation of the lure 10 about the forward loop 18 imparts an unequal amount of overall motion to the body plug 20 as compared to the trailing arm loop 54 (in other words, when the lure 10 rotates about the forward loop 18, the overall length of the arc traveled by the body plug 20 and its tail loop 26 will be different from the overall length of the arc traveled by the trailing arm loop 54).

The sliding blade 56, which is preferably smaller than the tail blade 30, is preferably both slidably and pivotally affixed to the arm 16. This may be accomplished by including an aperture 60 on the sliding blade 56 through which a yoke 62 freely extends, with the ends of the yoke 62 bearing holes 64 through which the arm 16 freely slides. If desired, rings, swivels, etc. could be interposed between the sliding blade 56 and the yoke 62, but this is not strictly necessary.

The trailing blade 58 is then preferably affixed to the trailing arm loop 54 of the second arm end 52 to allow its motion in six degrees of freedom. As shown in the FIGURE, this may be done by inserting a ring 66 (e.g., a split ring) and/or a swivel 68 between the second arm end 52 and the trailing blade 58.

Beads 70, which are preferably formed of translucent clear or colored plastic or crystal, are slidably or fixedly mounted on the arm 16. The beads 70 space the blades 56 and 58 apart so that they will not interfere with each other when tension is placed on the line 100 and the blades 56/58 begin spinning. Additionally, it is believed that the use of clear/translucent beads 70 helps to catch light and enhance the attractiveness of the lure 10 to fish. While any number of beads 70 may be provided at any location of the arm 16, the FIGURE illustrates the lure 10 as including three beads 70 slidably fit on the arm 16 between the sliding blade 56 and the trailing blade 58.

Because the sliding blade 56 (and beads 70) may freely slide along the length of the arm 16, if the lure 10 is pulled through the water by subjecting the fishing line 100 to repeated cycles of tension and slack, the sliding blade 56 and beads 70 will reciprocate along the length of the arm 16. Further, all of the tail blade 30, sliding blade 56, and trailing blade 58 will alternately trail directly behind the line 100 (when the line 100 is in tension) and then sink (when the line 100 is slack). Further, the tail blade 30 and trailing blade 58 are free to rotate about their respective swivels 32 and 68.

It is believed that particularly attractive performance is obtained by the lure 10 when the stem 14 and the tail loop 26 are oriented in a particular fashion with respect to each other on the body plug 20. More particularly, if one imagines an axis bisecting the aperture of the tail loop 26 and intersecting the body tail end 24 of the body plug 20 between the two ends of the tail loop 26, this axis preferably intersects the axis of the stem 14 at an angle; in other words, the body forward end 22 defines an axis which is not coincident with an axis defined within the body tail end 24, and the body plug 20 is "bent" so that the tail loop 26 is not axially aligned with the axis of the stem 14. Most preferably, the axis of the tail loop 26 is at an angle of 15 degrees-60 degrees with respect to the axis of the stem 14, with an angle of approximately 30 degrees being most preferred. This is believed to allow the tail blade 30 to more freely move through the water, and since the arm 16 tends to move symmetrically in response to the motion of the stem 14 and blade 30 (and vice versa), the entire lure 10 is believed to have more attractive sound and motion characteristics to fish.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, it is noted that the rings 34, 36, and 38 need not be circular rings, e.g., they may be rings having an oval or other shape, though circular rings are preferred. Similarly, the swivels 32 and 68 need not take the form of the barrel-type swivels illustrated in the FIGURE, and could instead take the form of crane swivels, ball bearing swivels, or other swivels known in the art.

Second, it is noted that the blades 30, 56, and 58 may be planar or may have convex/concave configurations, may be smooth or may bear patterns of dimples or other detailing, and may be either unadorned or colored throughout the entirety or a portion of their surfaces.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A fishing lure comprising:
  a. a body plug formed of a solid mass including:
    (1) a body forward end;
    (2) a body tail end opposite the body forward end;
    (3) an elongated rod-shaped stem extending between the body forward end and a stem end, the stem being rigidly affixed to the body forward end;
    (4) an elongated arm extending from the stem at a first arm end to terminate in a second arm end;
    (5) a tail loop rigidly affixed to the body tail end, wherein the distance between the stem end and the tail loop is less than the length of the arm;
  b. a swivel pivotally mounted to the tail loop;
  b. a tail blade pivotally mounted to the swivel opposite the tail loop;
  c. a hook pivotally mounted to the tail blade opposite the swivel; and
  d. arm blade affixed to the arm.

2. The fishing lure of claim 1 wherein the tail loop is not intersected by a stem axis defined by the elongated stem.

3. The fishing lure of claim 1 wherein the tail loop is bisected by a tail loop axis, and wherein the tail loop axis is at an angle to a body axis extending through the body forward end and the body tail end.

4. The fishing lure of claim 3 wherein the tail loop axis is at an angle of 15°–60° with respect to the body axis.

5. The fishing lure of claim 1 wherein the elongated stem defines a stem axis, and wherein the stem axis is situated at an angle with respect to a body axis defined between the body forward end and the body tail end.

6. The fishing lure of claim 1 wherein the tail loop is directly adjacent the body tail end.

7. The fishing lure of claim 1 wherein the arm blade is slidably mounted on the arm.

8. The fishing lure of claim 1 wherein the arm blade is pivotally affixed to the second arm end.

9. A fishing lure and fishing line in combination comprising:
  a. a body plug formed of a solid mass including:
    (1) a body forward end having a forward loop rigidly affixed thereto, wherein the forward loop is rigidly affixed to the body forward end by an elongated rod-shaped stem;
    (2) a body tail end having a tail loop rigidly affixed thereto, and
    (3) a protruding skirt comprising a plurality of strands;

b. a swivel having a forward swivel end and a tail swivel end, wherein the forward swivel end is pivotally mounted to the tail loop;

c. a tail blade pivotally mounted to the tail swivel end of the swivel;

d. a hook pivotally mounted to the tail blade;

e. an elongated arm having a first arm end extending from the stem, the arm having an arm blade affixed thereto; and f. a fishing line extending from the forward loop;

wherein the distance between the forward loop and the tail loop is less than the length of the arm.

10. The fishing lure and fishing line of claim 9 further comprising one or more rings situated between at least one of a. the tail loop and the swivel, b. the swivel and the tail blade, and c. the tail blade and the hook.

11. The fishing lure and fishing line of claim 9 wherein the arm blade is slidably mounted on the arm.

12. The fishing lure and fishing line of claim 9 wherein the arm includes a second arm end opposite the first arm end, and wherein the arm blade is pivotally affixed to the second arm end.

13. The fishing lure and fishing line of claim 9 wherein the elongated stem defines a stem axis, and wherein the stem axis is situated at an angle with respect to a body axis defined between the body forward end and the body tail end.

14. The fishing lure and fishing line of claim 9 wherein the tail loop is bisected by a tail loop axis, and wherein the tail loop axis is at an angle to a stem axis extending through the elongated stem.

15. The fishing lure and fishing line of claim 14 wherein the tail loop axis is at an angle of 15°–60° with respect to the stem axis.

16. The fishing lure and fishing line of claim 9 wherein the tail loop is directly adjacent the body tail end.

17. A fishing lure and fishing line in combination comprising:

a. a body plug formed of a solid mass including:
  (1) a body forward end having an elongated rod-shaped stem extending therefrom to end at a forward loop,
  (2) a body tail end having a tail loop rigidly affixed thereto, and
  (3) a protruding skirt comprising a plurality of strands;

b. an elongated arm having a first arm end affixed to the stem, the arm having arm blade affixed thereto, wherein the length of the arm is greater than the distance between the forward loop and the tail loop;

c. a swivel having a forward swivel end and a tail swivel end, wherein the forward swivel end is pivotally mounted to the tail loop, and d. a tail blade pivotally mounted to the tail swivel end of the swivel, e. a hook pivotally mounted to the tail blade; and f. a fishing line affixed to the stem;

wherein the tail loop is bisected by a tail loop axis, and wherein the tail loop axis is at an angle to a body axis defined between the body forward end and the body tail end.

18. The fishing lure and fishing line of claim 17 wherein the tail loop axis is at an angle of 15°–60° with respect to the body axis.

19. The fishing lure and fishing line of claim 17 wherein the tail loop is directly adjacent the body tail end.

20. The fishing lure and fishing line of claim 17 wherein the arm includes a second arm end opposite the first arm end, and wherein the arm blade is pivotally affixed to the second arm end.

* * * * *